United States Patent [19]

Geschwender

[11] 4,133,712

[45] Jan. 9, 1979

[54] APPARATUS FOR AND METHOD OF FORMING HONEYCOMB MATERIAL

[75] Inventor: Robert C. Geschwender, Lincoln, Nebr.

[73] Assignee: Lancaster Research & Development Corp., Lincoln, Nebr.

[21] Appl. No.: 764,269

[22] Filed: Jan. 31, 1977

Related U.S. Application Data

[63] Continuation of Ser. No. 551,056, Feb. 19, 1975, abandoned.

[51] Int. Cl.² .................. B32B 31/00; B65H 17/22
[52] U.S. Cl. ......................... 156/512; 83/315; 83/321; 156/264; 156/548; 226/111; 226/117; 226/119; 226/142
[58] Field of Search ............... 156/197, 264, 266, 291, 156/512, 548, 260, 361; 226/111, 117, 118, 119, 134, 139, 142; 83/37 R, 703, 509, 258, 511, 248, 241, 321, 356.2, 315, 318, 343, 347, 349

[56] References Cited

U.S. PATENT DOCUMENTS

| | | | |
|---|---|---|---|
| 3,011,672 | 12/1961 | Vesak | 217/30 |
| 3,076,368 | 2/1963 | Groll | 83/244 |
| 3,416,983 | 12/1968 | Steele | 156/197 |
| 3,518,151 | 6/1970 | Ellinor | 156/512 |
| 3,809,593 | 5/1974 | Burke et al. | 156/264 |
| 3,847,047 | 11/1974 | Jackson | 83/347 |
| 4,016,786 | 4/1977 | Körnor | 83/347 |

*Primary Examiner*—Douglas J. Drummond
*Assistant Examiner*—Michael W. Ball
*Attorney, Agent, or Firm*—Townsend and Townsend

[57] ABSTRACT

Apparatus for forming honeycomb material comprising a bonding station for continuously securing together an even numbered plurality of superimposed webs of flexible sheet material, such as paper, on lines extending longitudinally of the webs and spaced transversely across the webs at substantially equal intervals to form a composite web. A second adhesive station applies stripes of adhesive on an outside face on one of the webs constituting one outside face of the composite web, these outer stripes extending longitudinally of the composite web and each stripe being positioned intermediate the lines on the inside face of the one web securing this one web to the remaining webs of the composite web. A web feed is intermittently operable in cycles to feed forward an increment of the composite web beyond a reference line a predetermined distance and an intermittently operable drive drives the feed through a cycle to feed forward this increment of predetermined length with a dwell between successive cycles. Segmenting blades are operable during each dwell for segmenting this increment from the composite web and for stacking the resulting segments in a stack with the adhesive stripes on the one outside face of each segment adapted to engage the other outside face of an adjacent segment in the stack. A press compresses the stack of segments for bonding the segments together so as to form the honeycomb material. A method of manufacturing honeycomb material is also disclosed.

2 Claims, 20 Drawing Figures

APPARATUS FOR AND METHOD OF FORMING HONEYCOMB MATERIAL

This is a division of application Ser. No. 551,056, filed Feb. 19, 1975, now abandoned.

BACKGROUND OF THE INVENTION

This invention relates to apparatus for and a method of forming cellular honeycomb material, and more particularly to such apparatus and method in which segments of a composite web are bonded together in a stack to form a continuous core of compressed honeycomb material.

Honeycomb material is conventionally produced by either a rotary-type apparatus, such as disclosed in my U.S. Pat. No. 3,218,217, or by a segmenting-type apparatus, such as shown in U.S. Pat. No. 3,257,253. In my prior rotary-type apparatus, the cellular honeycomb material is formed by feeding forward a single web of paper or the like, longitudinally scoring the web, forming transverse lines of intermittent slits across the web, applying longitudinal stripes of glue to the web, and then folding the slitted web by means of a pair of meshing star wheels which pleat the web. The pleated web is then compressed between a pair of spaced guides to insure the pleats are bonded to one another along the various glue lines to form a compressed honeycomb core with the height of the pleats determining the thickness of the honeycomb core. While my prior art apparatus does continuously produce the honeycomb material at efficient production speeds, there is a tendency for the slitting rolls on a wide machine to deflect which may cause the slits in the web to be improperly cut and thus effects irregularities in the expansion of the honeycomb core produced. Also, with my prior rotary apparatus, it is an involved operation to modify the apparatus so as to produce honeycomb material of different thicknesses because it is necessary to change the slitting rolls and the star wheels for other rolls and star wheels of a different diameter. It is also necessary to change the drive ratio of the apparatus.

In the segmenting-type apparatus, shown in the above-mentioned U.S. Pat. No. 3,257,253, a composite web with glue stripes applied to one face thereof is continuously fed downwardly in a vertical reach into intermittently operable segmenting blades. A vertical web take-up is provided between the glue rolls and the segmenting blades. This web take-up allows the web to be continuously infed and intermittently outfed. Initially, excess web is infed into the take-up thereby causing the web to buckle so that upon the web being permitted to move into the segmenting means, these buckles forceably push the web downwardly into the blades. However, because the stiffness of these composite webs may vary considerably (depending on the physical properties of the webs constituting the composite web which may vary with the thickness of the webs, changes in humidity and the degree to which the webs are wetted by the glue), there is a tendency for the stored energy in the web to vary. Thus the stored up energy may be insufficient to insure that the web is fully advanced before it is segmented while in other instances excess web may be advanced past the blade before it is segmented. In either instance, honeycomb material of uneven height is produced.

SUMMARY OF THE INVENTION

Among the several objects of this invention may be noted the provision of apparatus for and a method of manufacturing honeycomb material which insure the formation of honeycomb material of uniform thickness; the provision of such apparatus and method in which the rate of honeycomb material formation may vary substantially without adversely affecting its quality; the provision of such apparatus which is readily adjustable to produce honeycomb material of any desired thickness within a predetermined range; the provision of such apparatus which is of rugged and economical construction and is reliable in operation; and the provision of such apparatus and methods which permit high production speeds. Other objects and features of this invention will be in part apparent and in part pointed out hereinafter.

Briefly, apparatus of this invention for forming honeycomb material comprises means for continuously securing together an even numbered plurality of superimposed webs of flexible sheet material, such as paper, on lines extending longitudinally of the webs and spaced transversely across the webs at substantially equal intervals to form a composite web. Means are provided for applying stripes of adhesive on an outside face of one of the webs constituting one outside face of the composite web, these stripes extending longitudinally of the composite web and each stripe being positioned intermediate the lines on the inside face of the web securing the one web to the remaining webs of the composite web. Feed means intermittently operate in cycles to feed forward an increment of the composite web beyond a reference line, a predetermined distance. Other means operate intermittently for driving the feed means through a cycle to feed forward the increment of predetermined length with a dwell between successive cycles. Still other means are operable during each dwell for segmenting the increment from the composite web and for stacking the resulting segments in a stack with the adhesive stripes on the outside face of each segment adapted to engage the other outside face of an adjacent segment in the stack. Means are provided for compressing the stack of segments for bonding the segments together so as to form the honeycomb material.

In accordance with this invention honeycomb material is fabricated by continuously feeding an even-numbered plurality of webs of flexible sheet material along a path, and securing the webs together in face-to-face superimposed relation along lines extending generally longitudinally of the webs and spaced transversely across the webs substantially at equal intervals to form a composite web. Then, stripes of adhesive are applied to one outside face of the web constituting the outside face of the composite web. These stripes extend longitudinally of the composite web and each of these stripes is positioned intermediate the lines securing the one web to the other webs comprising the composite web. The composite web is then intermittently and positively fed forward a predetermined increment, and segmented to form a segment. These segments are then stacked in a stack with the adhesive stripes on the outside face of one of the segments in engagement with the other outside face of the next adjacent segment in the stack. The stack of segments is then compressed thereby to form a web of honeycomb material.

BRIEF DESCRIPTION OF THE DRAWINGS

Corresponding reference characters indicate corresponding parts throughout the several views of the drawings.

DESCRIPTION OF PREFERRED EMBODIMENTS

Referring now to the drawings, and particularly to FIGS. 1 and 2A–2C, apparatus of this invention for forming honeycomb material HC is indicated in its entirety at 1. Generally, this apparatus includes a frame 3 and means, generally indicated at 5, for rotatably supporting rolls, as indicated at R1, R2, R3 and R4, of flexible sheet material, such as kraft paper or the like.

The apparatus further includes means 7 for continuously securing together (e.g., as by adhesively bonding or glueing) an even-numbered plurality (e.g., 2, 4, 6 . . .) of webs on lines generally indicated at L (see FIG. 2B) extending longitudinally of the webs and spaced transversely across the webs at substantially equal intervals to form a composite web C. Means 9 (see FIG. 2C) is provided for applying stripes A of adhesive or glue (see FIGS. 16 and 17) on an outside face of one of the outside webs of the composite web (e.g., on its bottom face). These stripes extend longitudinally of the composite web and stripes A are positioned intermediate the glue lines L on the inside face of the stated one outside web (e.g., on the outside face of the bottom of the composite web). The relation of these glue lines or stripes will be more fully explained hereinafter.

Apparatus 1 further comprises feed means 10 (see FIGS. 2C and 3), which is intermittently operable in cycles for feeding forward an increment of composite web C beyond a reference line RL a predetermined distance. This feed means is intermittently driven by drive means 11 (FIG. 2C) to feed forward the above-mentioned increment of web C with a dwell between successive cycles. A segmenting means 13 (FIG. 2C), operable during each dwell of the feed means severs an increment from the composite web, thus forming a segment SG, and stacks these segments in a stack SK with the adhesive stripes A on the outside or bottom face of each segment being disposed to engage the other outside or top face of an adjacent segment in the stack so as to adhere the segments in the stack together. Other means as indicated at 15 (see FIGS. 12 and 13), compresses the stack of segments together, so as to form a core of unexpanded honeycomb material HC.

Figure 1:
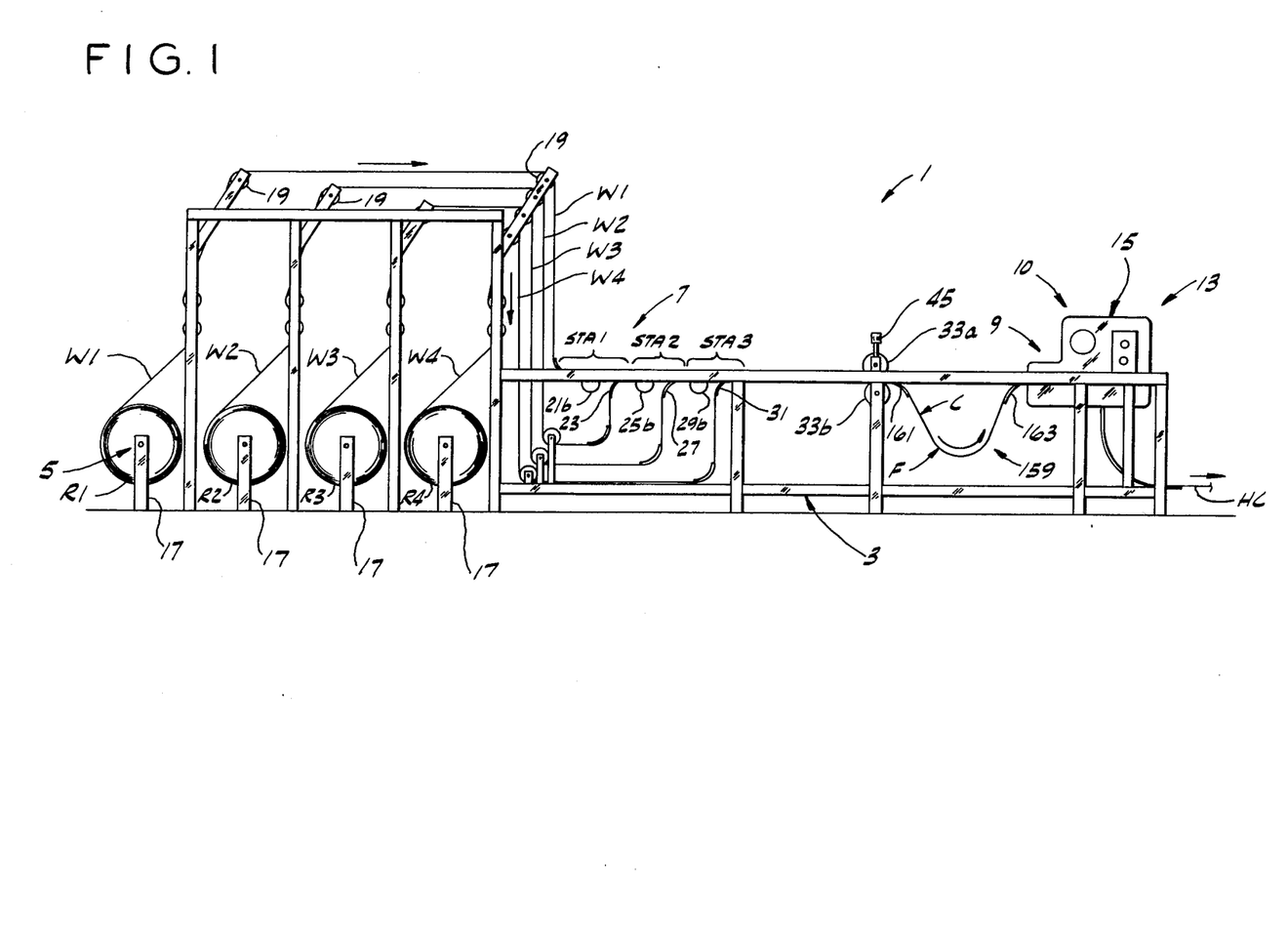
FIG. 1 is a side elevation of apparatus of this invention for forming honeycomb material in which the major components of the apparatus are illustrated.
Figure 16:
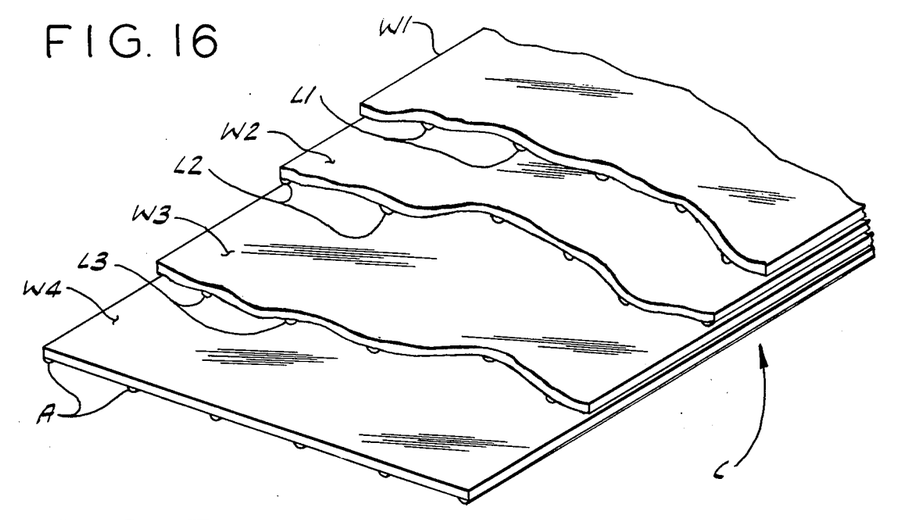
FIG. 16 is a perspective view of the composite web with the various webs progressively broken away to illustrate the position of the glue lines joining the various webs.
Figure 17:
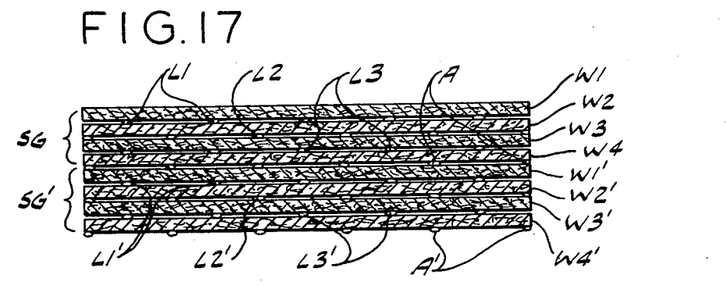
FIG. 17 is a vertical section taken on line 17—17 of FIG. 12 illustrating a portion of the compressed honeycomb material formed by the apparatus of this invention.
Figure 18:
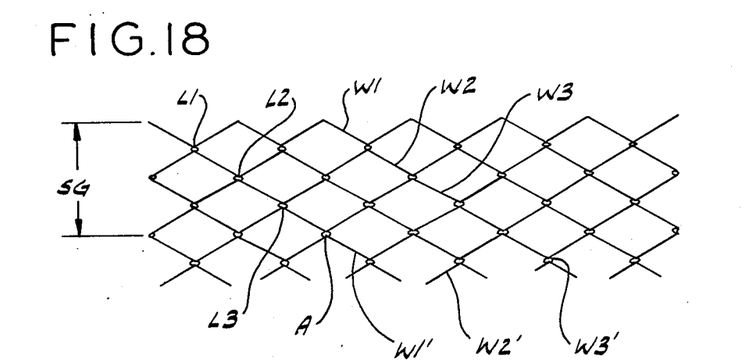
FIG. 18 is a top view of a portion of the honeycomb material produced by apparatus of this invention after it has been expanded.

Referring to FIG. 1, apparatus 1 is shown to have four roll supports 17 at one end (i.e., the left end as shown in FIG. 1), for rotatably supporting four rolls R1–R4 of kraft paper from which respective webs W1–W4 are unwound. These webs are supported by frame 3 above the rolls and are carried over rollers 19. At a first station STA1 of securing means 7, a pair of rolls 21a, 21b applies stripes L1 (see FIGS. 16 and 17) of adhesive between webs W1 and W2 (i.e., to the lower face of web W1) and a guide 23 brings web W2 into engagement with glue stripes L1 on web W1 for bonding webs W1 and W2 together in face-to-face superimposed relation. The glue lines L1 applied to web W1 are spaced substantially at equal intervals transversely of the web (see FIG. 16). Securing means 7 also has stations STA2 and STA3 at which respective pairs of rolls 25a, 25b and 29a, 29b are provided. Rolls 25a, 25b apply glue lines L2 to the lower face of web W2, and a guide 27 joins web W3 and webs W1, W2 together in face-to-face superimposed relation. As is best shown in FIGS. 16 and 17, glue lines L2 are intermediate glue lines L1. Rolls 29a, 29b apply a third series of longitudinal glue Lines L3 to the bottom face of web W3. This third series of glue lines L3 is substantially in register with the first series of glue lines L1. A guide 31 brings the fourth web W4 into engagement with glue lines L3 on web W3, thus adhering the fourth web to the first, second and third webs to form composite web C. It will be understood that any even-numbered plurality of webs may be similarly secured together to form the composite web. Rolls 21b, 25b and 29b are shown to be glue applicator rolls and rolls 21a, 25a and 29a are shown to be backup rolls.

Figure 2A:
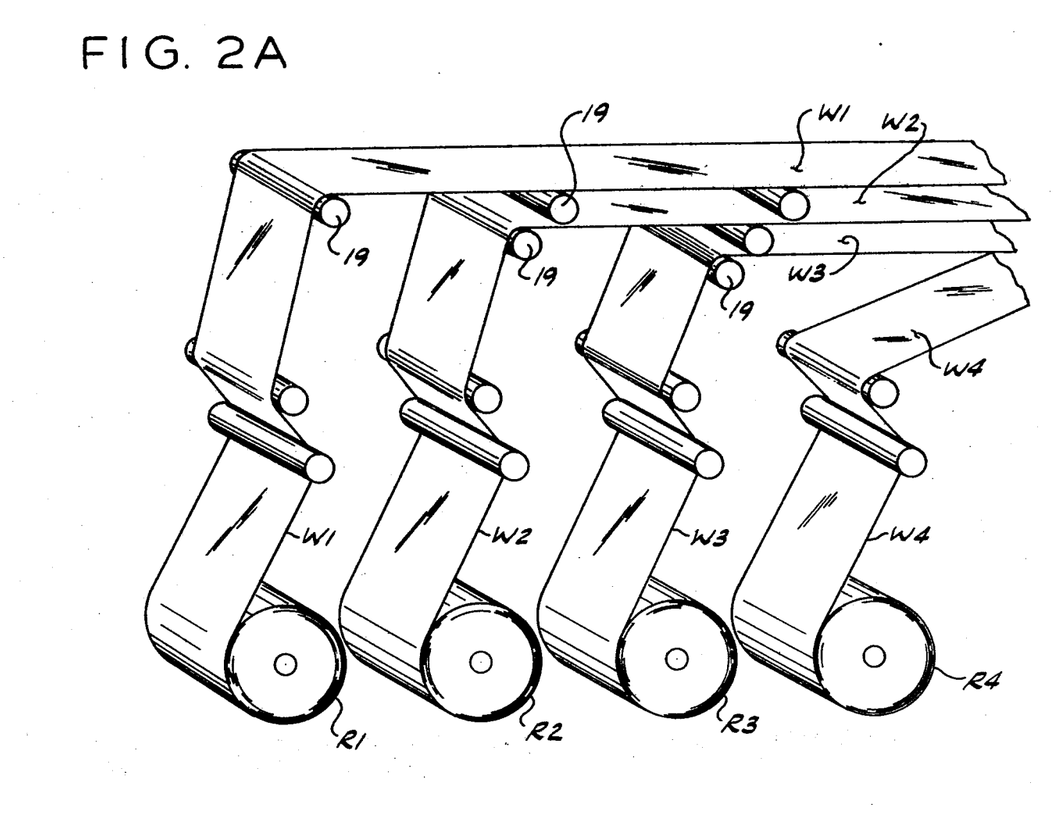
FIGS. 2A–2C are semi-diagrammatic perspective views illustrating the principal components of the apparatus of this invention and the principal steps in the method of this invention.
Figure 2B:
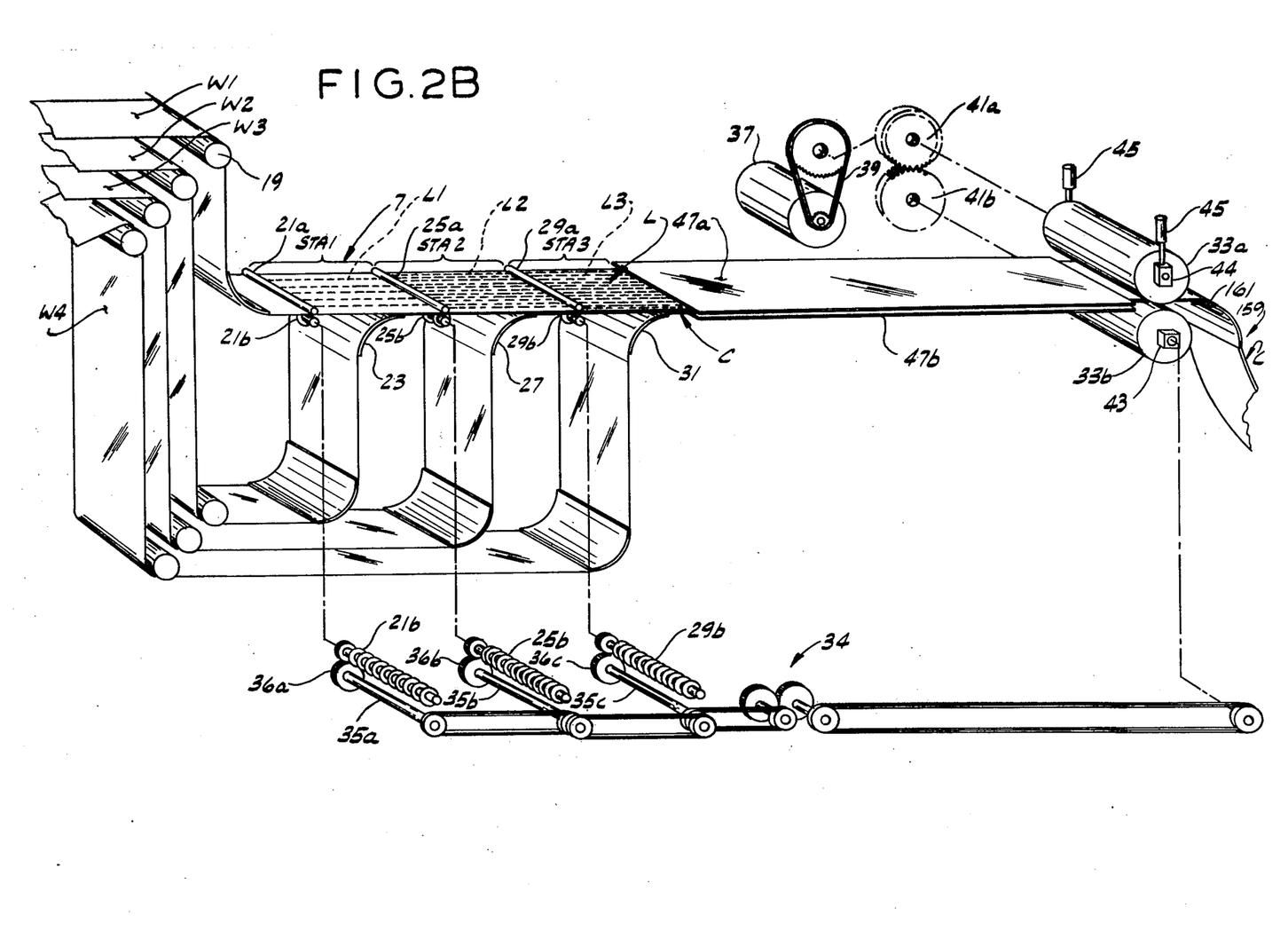
Figures 2C, 3:
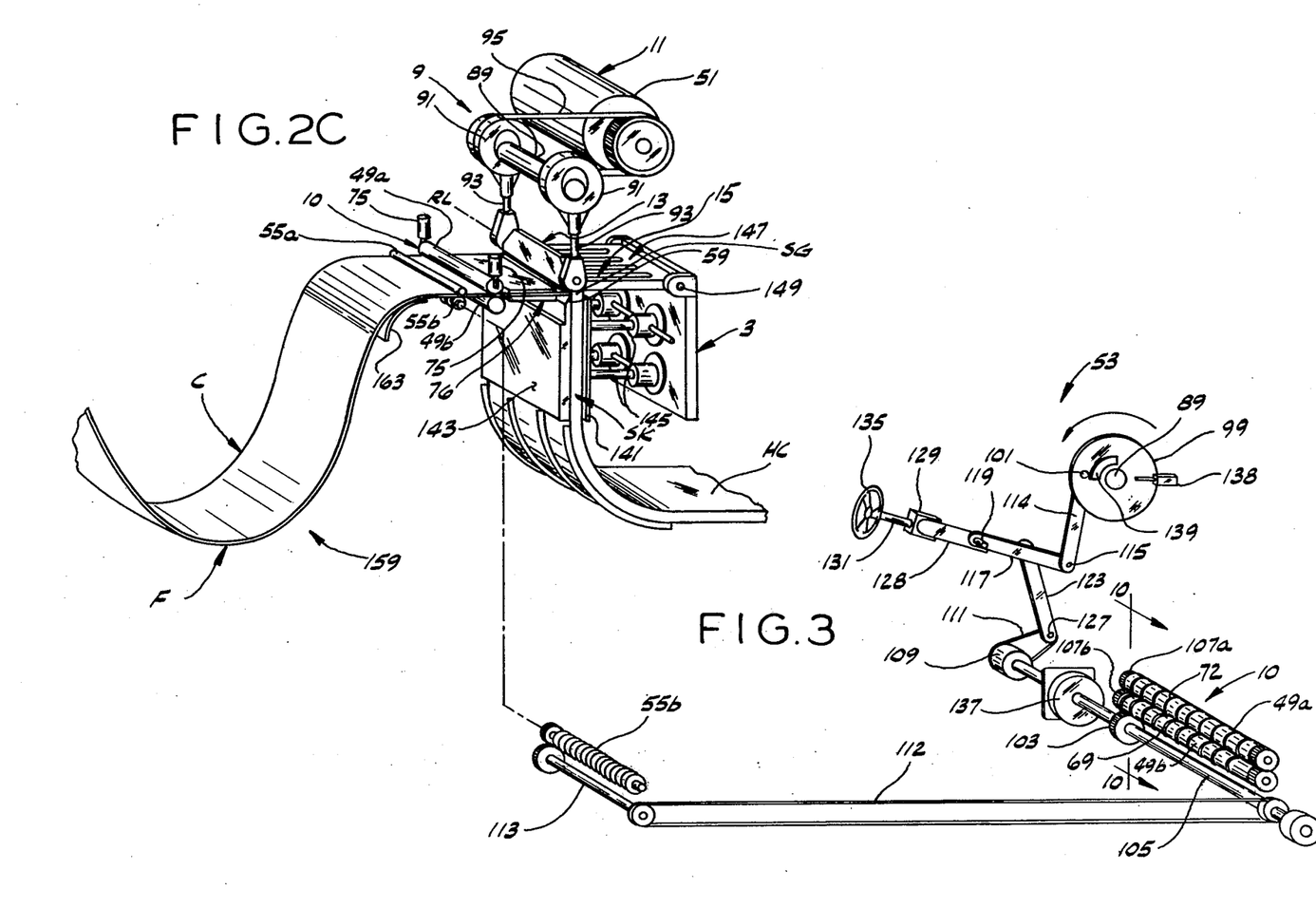
FIG. 3 is an enlarged semi-diagrammatic perspective view of a portion of FIG. 2C illustrating means for positively feeding the composite web forward in increments a predetermined distance for being segmented.

The composite web C is gripped between a pair of drive rolls 33a, 33b. The glue rolls at stations STA1-STA3 are driven at the speed of drive rolls 33a, 33b by means of a chain and sprocket arrangement generally indicated at 34. More particularly, chain and sprocket arrangement 34 includes a drive shaft 35a, 35b, 35c for glue rolls 21b, 25b and 29b, respectively, with these glue rolls being driven by pinion gears 36a, 36b and 36c carried by their respective drive shaft. Thus, the glue rolls at stations STA1, STA2, and STA3 and feed rolls 33a, 33b are driven at the same speed and in the same direction so that webs W1–W4 are continuously conveyed through securing means 7 and so that the composite web C is continuously conveyed along its path through the apparatus to the intermittently operable feed means 10. A drive motor 37 mounted on frame 3 drives drive rolls 31a, 33b via another chain and sprocket drive assembly 39 and via gears 41a, 41b. Drive roll 33b is supported by bearings 43 for rotation about a fixed horizontal axis. Drive roll 33a is supported by floating bearings 44 permitting this roll to move vertically with respect to drive roll 33b and thus maintaining rolls 33a, 33b in gripping engagement with the composite web C by means of fluid cylinder (air cylinder) units 45 which maintain a desired gripping pressure on the web as it passes over roll 33b. By adjusting the fluid (air) pressure applied to these cylinder units, the gripping pressure on the composite web may readily be varied to accommodate a variety of composite web thicknesses and variations in the thickness of the composite web as it is formed. Between guide 31 and drive rolls 33a, 33b, heated platens 47a, 47b engage the outer faces of composite web C and heat it so as to aid glue lines L1–L3 to at least partially cure.

Referring now to FIGS. 2C, 3, 13 and 14, the intermittently operable feed means 10 is shown to comprise a pair of feed rolls 49a, 49b in gripping engagement with composite web C. The intermittent drive further includes a drive motor 51 constituting drive means 11 and means 53 interconnecting the feed rolls 49a, 49b and segmenting means 13 for operating the feed rolls through a cycle so as to positively advance the composite web forward an increment of predetermined length corresponding to the desired length of segments SG to be formed and thus corresponding to the thickness of the honeycomb core HC to be formed. This interconnecting means also positively stops the feed rolls. The segmenting means is operated during the dwell between feed cycles during which the composite web is stopped. A pair of rolls including a backup roll 55a and a glue or adhesive applicator roll 55b are intermittently driven with feed rolls 49a, 49b to apply adhesive stripes A (see FIGS. 16 and 17) to the bottom face of composite web C.

Figures 9, 10:
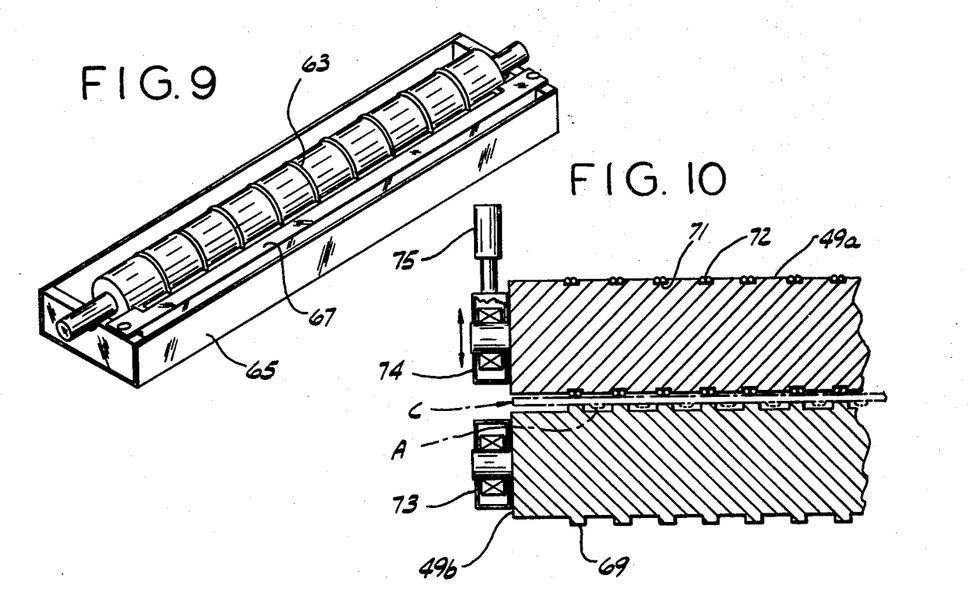
FIG. 9 is a perspective view of a glue roll for applying longitudinal stripes of adhesive to one outside face of a web.
FIG. 10 is a partial vertical cross sectional view taken on line 10—10 of FIG. 3 illustrating a pair of drive rolls engaging the composite web between stripes of adhesive previously applied to one face of the composite web for positively feeding the composite web forward without disturbing the stripes of adhesive.
Figure 11:
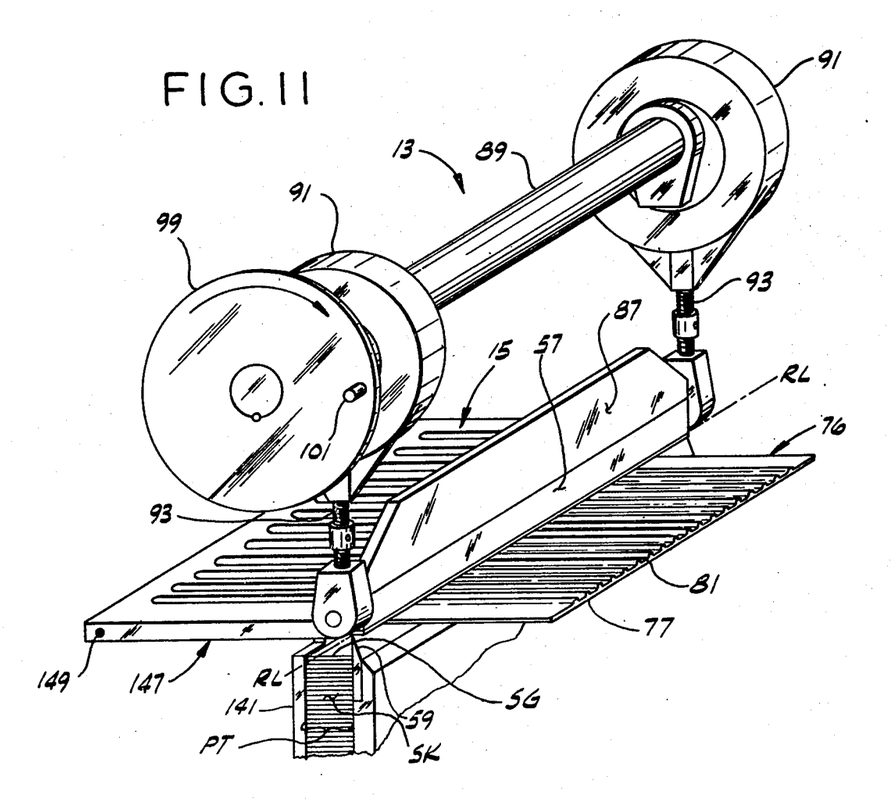
FIG. 11 is an enlarged perspective view of means for intermittently segmenting the composite web.
Figure 12:
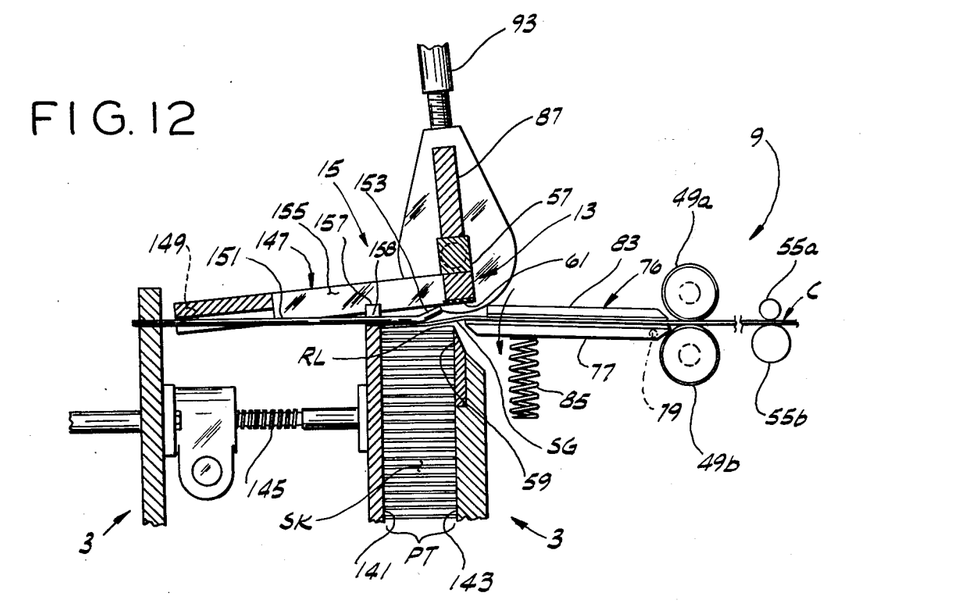
FIG. 12 is a vertical section taken on line 12—12 of FIG. 2C illustrating means for applying stripes of adhesive to the composite web, means for intermittently advancing the composite web forward a predetermined distance, and means for segmenting the composite web and stacking the resulting segments in a stack to form a core of honeycomb material, the segmenting means being shown in its raised retracted position to permit the web to be advanced.
Figure 13:
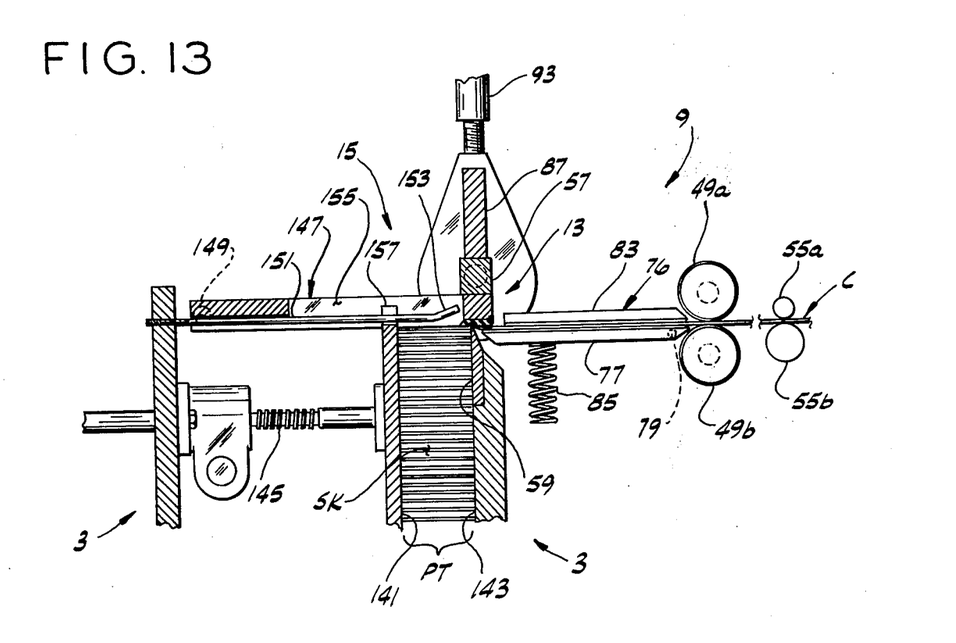
FIG. 13 is a view similar to FIG. 12 with the segmenting means in its closed, cutting position for segmenting the web and for compressing the stacked segments.
Figure 14:
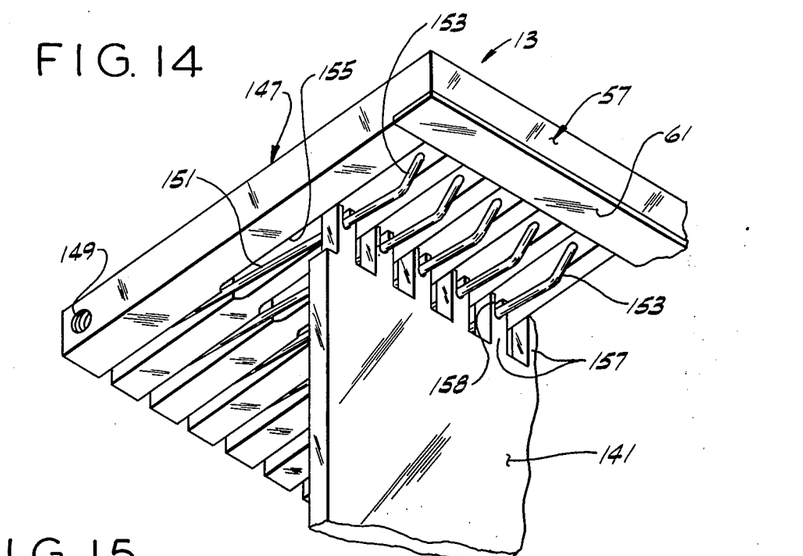
FIG. 14 is an enlarged partial bottom perspective view of the segmenting and compressing means shown in FIGS. 12 and 13.
Figure 15:
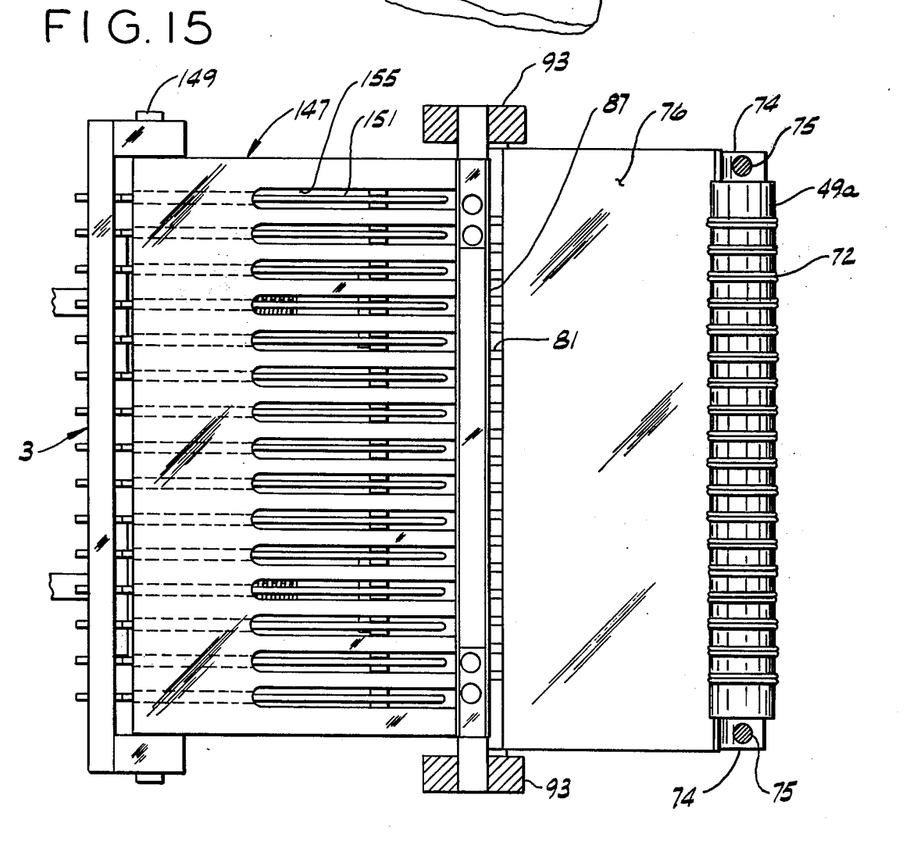
FIG. 15 is a plan view of the segmenting and compressing means.

As best shown in FIGS. 11–13, segmenting means 13 comprises an anvil 57 and a blade 59 movable toward and away form one another by drive motor 51 to segment web C. Blade 59 is stationary and the composite web passes over it. The anvil is movable toward and away from the blade from a raised retracted position (see FIG. 12) above blade 59 and web C to a cutting position (see FIG. 13) in cutting engagement with web C and blade 59 to segment the web. The cutting edge of blade 59 is shown to constitute the above-mentioned reference line RL. Anvil 57 has a resiliently backed, steel facing member 61 adhered to its bottom face for being resiliently deformed by blade 59 as the anvil cuttingly engages web C thereby to insure that segments SG are cleanly severed from the web by crush cutting, i.e. by severing the segment from the web between the cooperating edge of blade 59 and the opposing, perpendicular anvil surface of face member 61. In FIG. 9, a typical glue roll, such as is used at stations STA1-STA3 and constituting rolls 21b, 25b or 29b, or constituting glue roll 55b is located generally below the web which is to have glue lines placed thereon. A nip or backup roll (not shown in FIG. 9) which constitutes rolls 21a, 25a, 29a or 55a is journalled above the glue roll to grip the web between the glue roll and the nip roll. The glue roll has a plurality of glue applicator rings 63 spaced at equal intervals along its length for contacting the bottom face of the web and for applying glue lines thereto spaced transversely across the web, the spacing of these applicator rings corresponding to the desired spacing and location of the glue lines to be applied. The glue roll is journalled in a glue reservoir 65 with the lower portion of the glue roll immersed in a glue bath so as to coat the outer surfaces of the applicator rings as the roll rotates. A notched doctor blade 67 removes excess glue from rings 65 and from the glue roll.

Glue rolls 55a, 55b are shown on the upstream side of feed rolls 49a, 49b to apply glue lines A to the bottom face of web C prior to the composite web being gripped by the feed rolls. Feed roll 49b (see FIG. 10) is shown to have a series of contact rings 69 spaced at equal intervals along its length for engaging web C intermediate glue lines A thereby not to disturb the glue lines as the composite web is fed forward. Feed roll 49a has a series of annular grooves 71 spaced along its length, one for each ring 69 on roll 49b. Resilient O-rings 72 are provided in each annular groove 71. These O-rings project beyond the cylindric surface of roll 49a and constitute a resilient gripping surface. With feed rolls 49a, 49b in gripping engagement with web C, the web is resiliently gripped by rings 69 and O-rings 72 without disturbing glue stripes A. Also, the resilient O-rings 72 enable the feed rolls to accommodate variations in thickness of web C and yet to maintain a positive gripping engagement with the web as the web is fed forward. Like drive roll 33b, feed roll 49b is journalled in bearings 73 for rotation of a fixed horizontal axis, and like roll 33a, roll 49a is journalled in bearings 74 which are adjustably movable in vertical direction by air cylinder units 75 thereby to maintain a positive gripping force on the composite web.

Upon exiting feed rolls 49a, 49b, composite web C with glue lines A on its undersurface advances toward blade 59 for being segmented. Between rolls 49a, 49b and blade 59 a pivoted, spring-biased guide 76 (see FIGS. 11-13) is provided for lifting the web clear of blade 59 as the web is advanced forward, thereby to prevent the blade from disturbing the glue stripes on the lower surface of the web and to permit blade 59 and anvil 57 to segment the web. Guide 76 includes a lower guide plate 77 pivoted, as indicated at 79, adjacent rolls 49a, 49b for pivoting about a horizontal axis. As shown in FIG. 11, guide plate 77 has a series of longitudinal ribs 81 spaced intermediate glue lines A, thereby to support web C as it is fed forward without disturbing the glue lines. An upper web plate 83 is spaced from ribs 81 with web C passing betweeen these guide plates and being maintained in engagement with ribs 81 of the lower guide plate. Plate 83 is pivotally movable with plate 77 and compression coil springs 85 distal from pivot axis 79 bias the guide plates 77 and 83 to a position above the level of blade 59 so that as the web is fed forward it is held clear of the blade. In addition to allowing the web to be fed forward without disturbing the glue stripes, guide 76 prevents excess glue from being deposited on the blade as the web is fed forward, which may cause the blade to improperly segment the web and thus lessens the requirement to periodically clean the blade. Upon anvil 57 moving from its raised retracted position in which it is clear of the web as the web is fed forward to its cutting position, a portion of pad 61 on the anvil engages the outer end of guide plate 77 and forces the guide plate to rotate downwardly toward blade 59 thereby compressing springs 85. Thus it will be seen that the structure of feed rolls 49a, 49b and guide 76 is such that the glue lines A remain undisturbed until the web is segmented and stacked in stack SK to form honeycomb core material HC. The spacing of ribs 81 on plate 77 is such that the glue lines A having a variety of center-to-center spacings may be accommodated without changing the guide plate. For example, glue line spacings of 5/16", ⅝" and 15/16" (7.9, 15.9 and 23.8 mm., respectively) may be accommodated.

Referring now to FIGS. 2C and 11-13, segmenting means 13, anvil 57 and blade 59 are shown in detail. More particularly, blade 59 is fixedly supported by frame 3 and anvil 57 is carried by a stiff anvil support 87. A shaft 89 is journalled by the frame and this shaft has eccentric drives 91 thereon. These eccentric drives are connected to anvil support 87 by adjustable turnbuckle fittings 93. These eccentric drives are continuously rotatably driven by motor 51 via a timing belt 95 (see FIG. 2C) so as to cause the anvil to eccentrically move between its retracted and cutting positions during the above-mentioned dwell of the feed of composite web C so as to permit the web to be advanced without interference from the anvil. The above-mentioned intermittently operable feed rolls 49a, 49b are also driven by motor 51 via interconnecting drive means 53. As is best shown in FIGS. 3-8, this interconnecting drive means 53 operates feed rolls 49a, 49b through a cycle so as to advance the composite web C forward an increment of predetermined length and to positively stop the feed rolls. This interconnecting means is adjustable to vary the operating cycle of the feed rolls (i.e., to vary the angle through which the feed rolls are rotated during each cycle) and to thus vary the predetermined length of the segments and hence to vary the height of the honeycomb material HC formed by the apparatus.

More particularly, interconnecting means 53 is shown to comprise a circular plate 99. This plate is driven by eccentric drives 91 and makes one revolution for each cycle of anvil 57. An eccentric pin 101 projects outwardly from plate 99. Feed rolls 49a, 49b are driven by a pinion gear 103 fixedly secured on a shaft 105 below roll 49b (see FIG. 3), this pinion gear driving gears 107a, 107b on shafts 49a, 49b, respectively. Shaft 105 is driven through a cycle by a one-way clutch 109. A crank arm 111 extends out from the one-way clutch for driving shaft 105. An adjustable linkage arrangement constituting a portion of interconnecting means 53 interconnects eccentric pin 101 and crank arm 111. Glue roll 55b is driven by a chain and sprocket drive 112 interconnecting shaft 105 and a drive shaft 113 for roll 55b. Thus, glue rolls 55a, 55b are intermittently driven by means 53 in phase with rolls 49a, 49b.

Figures 4, 5:
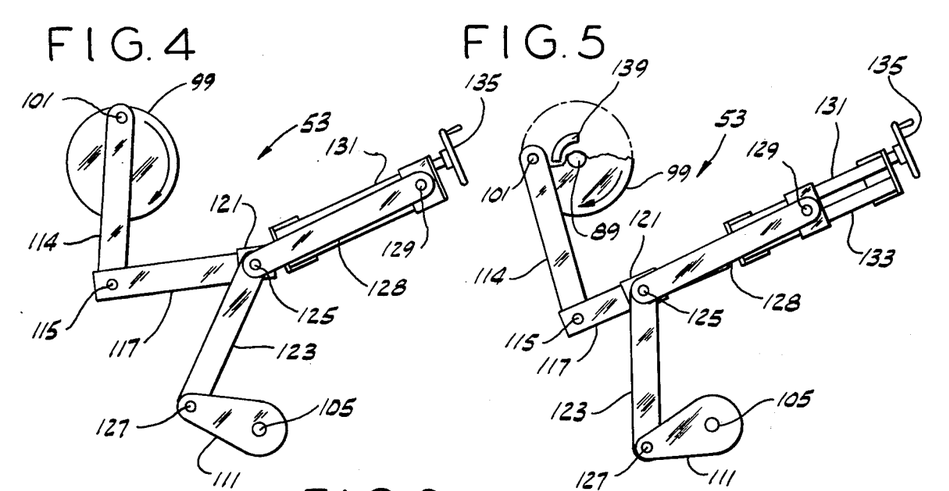
FIGS. 4–8 show various positions of the drive linkage interconnecting the feed means and segmenting means.
Figures 6, 7, 8:
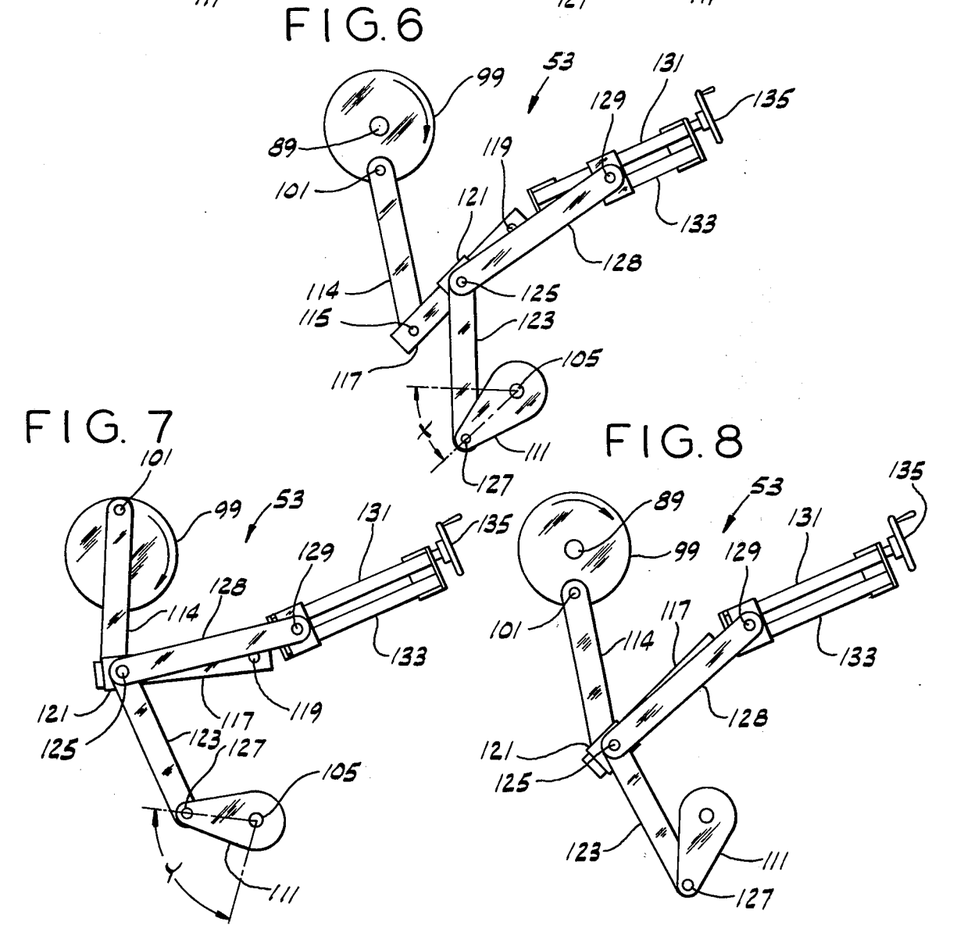

Specifically, this linkage arrangement includes a first link 114 pivotally connected at one end to pin 101 on plate 99 and at its other end 115 to a slide bar 117. This slide bar is pivoted to frame 3, as indicated at 119 (see FIGS. 6 and 7). A slider 121 is slidably carried by the slide bar and one end of a second link 123 is pivotally connected at 125 to slider 121 and at its other end 127 to crank 111 on shaft 105. A third link 128 has one end thereof pinned, as indicated at 125, to slider 121 and has its other end pinned to an adjustable pivot point, as indicated at 129. Pivot point 129 is shown to be carried on a threaded shaft 131 and on a slide rod 133 secured to frame 3 so that the pivot point is adjustably movable generally toward and away from a line between shafts 89 and 105. Shaft 131 may be manually rotated by means of a hand wheel 135 so as to move pivot point 129 relative to fixed pivot point 119. By adjusting the position of pivot pin 129, the arc through which crank 111 and shaft 105 is oscillated for each revolution of plate 99 and pin 101 may be varied. For example, with pivot pin 129 adjacent handwheel 135 so that pivot points 119 and 125 coincide (see FIG. 4), neither link 123 nor crank 111 will oscillate. With pivot pin 129 so adjusted, feed rolls 49a, 49b will not advance composite web C. With the pivot pin 129 in its position as shown in FIGS. 5 and 6 intermediate the ends of slide rod 133, crank 111 will oscillate through an arc X (see FIG. 6) with the feed rolls advancing the web forward a small increment. With the pivot pin 129 in position as shown in FIGS. 7 and 8, crank 111 is oscillated through a maximum arc Y (see FIG. 7) and then web C will be advanced a maximum distance on each cycle of the apparatus. It will be understood that by adjusting hand wheel 135 the arc through which crank 111 is oscillated may be infinitely varied within a predetermined range so that the increment web C is advanced may be precisely controlled. For example, segments SG may be formed having widths ranging from ⅜" (0.96 cm.) to 4" (10.1 cm.) thereby producing honeycomb core material HC having a corresponding range of thicknesses. Also, it will be noted that this adjustment may be made while the apparatus is in operation.

The operation of interconnecting means 53 is as follows: Starting with eccentric pin 101 and pivot pin 129 in their positions shown in FIG. 7, clockwise rotation of plate 99 causes slide bar 117 to pivot in counterclockwise direction about pivot 119. This in turn causes crank 111 to oscillate in counterclockwise direction in an arc about drive shaft 105 via one-way clutch 109. Upon eccentric pin 101 continuing to rotate in clockwise direction through its bottom dead center position (as shown in FIG. 8) at which point crank 111 is oscillated a maximum amount, the crank is caused to oscillate in the opposite or clockwise direction driving shaft 105 and feed rolls 49a, 49b via one-way clutch 109 which serves as a ratchet drive for the feed rolls. It will be understood that only as eccentric pin 101 rotates from its bottom to its top dead center position is movement of web C effected because the one-way clutch prevents reverse rotation of shaft 105 and this constitutes the above-mentioned dwell in the operation of the web feed and segmenting means.

As crank 111 oscillates through its arc, it initially accelerates shaft 105. Upon reaching the midpoint of its arc, it begins to decelerate. However, because of one-way clutch 109, shaft 105 will tend to continue to rotate or overrun. A brake 137, such as an air brake, is provided on shaft 105 for positively decelerating the shaft and for positively stopping feed rolls 49a, 49b so as to insure that the proper increment of web C is fed beyond reference line RL (i.e., beyond blade 59) for being segmented. Thus, brake 137 constitutes means for positively preventing overrun of the feed rolls. Brake 137 is actuated by an actuator, such as an air switch 138 (see FIG. 3), which is tripped by a lug 139 on plate 99 as crank 111 oscillates through the midpoint of its arc (i.e., lug 139 engages the actuating arm of switch 138 when the pin 101 is in the 3-o'clock position as viewed in FIG. 3). With brake 137 actuated, crank 111 will continue to drive shaft 105 and feed rolls 49a, 49b against the drag of the brake to positively outfeed the desired increment of web C. Upon crank 111 reaching the end of its oscillatory stroke, brake 137 insures that drive rolls 49a, 49b are also positively stopped. Thus, overrun to the web is prevented. The oscillatory stroke of crank 111 stops as pin 101 passes through its top dead center position and does not begin until the pin passes through its bottom dead center position. Brake 137 is released shortly after the pin passes its top dead center position and after the drive rolls have stopped. It will be understood that means other than a pneumatic brake may be utilized to positively stop rotation of feed rolls 49a, 49b. For example in high-speed applications, a cam actuated mechanical brake may be preferred, and in other applications an electric brake may be preferred.

Referring now to FIGS. 2C and 12-15, it is seen that as the leading edge of web C is advanced past reference line RL (i.e., past the edge of blade 59) a predetermined distance corresponding to the desired width of segments SG, it abuts against an adjustable wall 141 which serves as a stop for the web and as an adjustable guide for the stack SK of segments SG which form a compressed core of honeycomb material HC. A rigid support 143 for blade 59 serves as a fixed guide for the stack with the space between wall 141 and support 143 constituting a packing throat PT. It will be noted that the inner surface of support 143 is in the same vertical plane as the cutting edge of blade 59 and thus is in the same vertical plane as reference line RL. Wall 141 is adjustable toward and away from support 143 by means of a plurality of screw jacks 145 carried by frame 3 to accommodate various widths of segments SG and thus to accommodate various honeycomb core thicknesses. Adjustable wall 141 positively stops forward motion of the web C, and it may be considered as a second means for adjusting the predetermined lengths of segments SG. Furthermore, wall 141 may be adjusted to abut the leading edge of web C prior to feed rolls 49a, 49b being positively stopped by air brake 137 so that after the web engages wall 141, it is continued to be positively fed forward by the feed rolls. This continued forward feeding of the web compresses the web before it is segmented and thus tends to compact the thickness of the honeycomb core HC. Upon carrying the width of segments SG (or upon varying the thickness of the honeycomb core HC), it will be understood that screw jacks 145 are first adjusted and then hand wheel 135 is adjusted.

As heretofore mentioned upon a segment SG being segmented from web C, it is stacked in packing throat PT on top of other segments to form a stack SK with the glue lines A on the bottom face of the last-segmented segment engaging the other or top face of the next adjacent segment in the stack which has no glue lines thereon with all the segments in the stack being thus bonded together. In FIGS. 11-15, stack compressing means 15 is shown to comprise a slotted packing ram 147 pivotally movable with anvil 57 for engagement with the upper face of the last segmented segment SG for pushing this last-segmented segment down into packing throat PT and for compressing the stack SK. As shown in FIG. 2C, the stack SK continuously exits the bottom of the packing throat as new segments are added at the top throat and as the stack is compressed. It will be understood that the friction of the stack on wall 141 and support 143 is sufficient to permit the stack to be adequately compressed in the packing throat.

More particularly, packing ram 147 is pivoted, as indicated at 149, for pivoting about a horizontal axis as anvil 57 moves between its raised retracted and lowered cutting positions. A plurality of guide rods 151 are cantilevered from frame 3 behind wall 141 to extend above packing throat PT and toward blade 59. These guide rods are positioned above the level of web C as it is fed forward on guide plate 77 when the guide plate is in its raised position (see FIG. 12). As indicated at 153, the ends of guide rods 151 are bent up to insure that the leading edge of web C is maintained below the rods as the web is fed forward. Packing ram 147 is shown to be a plate having a plurality of longitudinal slots 155 therethrough, one slot for each guide rod 151, for reception of its respective guide rod as the packing ram moves vertically with the anvil between its raised retracted position (see FIG. 12) and its lowered packing position (see FIG. 13). As shown in FIG. 13, with the packing ram in its lowered packing position, the bottom of the plate is below the level of the guide rods and thus engages the top face of the last-segmented segment SG and thus compresses the stack SK. Wall 141 has a series of upwardly projecting lugs 157 extending up from the upper end of the wall, these lugs being received by corresponding slots 155 in the packing ram thereby to permit the packing ram to move below the level of the upper reaches of wall 141 as the packing ram moves to its lowered packing position. Each lug 157 is notched, as indicated at 158 (see FIG. 14), for reception of a respective guide rod 151. It will be understood that as the web is advanced into the packing throat PT, it contacts the inner faces of lugs 57 to stop movement of the web.

Plate 99 on shaft 89 rotates one revolution driving eccentric drives 91 for each cycle of segmenting means 13 and intermittent feed rolls 49a, 49b. The feed rolls are driven forward as pin 101 on plate 99 rotates in clockwise direction (as viewed in FIGS. 4-8 and 11) from its bottom dead center to its top dead center position. Thus, the web dwells during the other half of the cycle after it has been advanced a predetermined increment. As pin 101 rotates from its midpoint position between its bottom and top dead center positions to its midpoint position between its top and bottom dead center positions (i.e., between its 0- and 3-o'clock positions as viewed in FIG. 11), the eccentric drives 91 initiate movement of anvil 57 from its raised retracted to its cutting position and then immediately retracts or returns the anvil to its raised retracted position after the web has been segmented. Of course, this segmenting or shearing movement of anvil 57 and movement of packing ram 147 are completed in a relatively short time well before eccentric pin 101 reaches its bottom dead center position.

As previously mentioned, drive rolls 33a, 33b which pull webs W1-W4 through stations STA1-STA3, and which pull composite web C through heated platens 47a, 47b are continuously driven, and feed rolls 49a, 49b which incrementally advance web C a predetermined length for being segmented are intermittently driven. Thus, in accordance with this invention, take-up means, as generally indicated at 159, is provided for taking up the continuous outfeed of the continuously operable drive rolls 33a, 33b and for permitting intermittent infeed of composite web C to the intermittently driven feed rolls 49a, 49b. As best shown in FIGS. 1 and 2B-2C, this take-up means 159 comprises a downwardly curved guide plate 161 on the outfeed side of rolls 33a, 33b and another guide plate 163 adjacent rolls 55a, 55b for freely supporting the composite web C therebetween in a festoon F which allows the composite web to be continuously fed into the festoon from rolls 33a, 33b and to be intermittently outfed by feed rolls 49a, 49b.

In operation, the apparatus 1 of this invention may be operated at speeds in excess of 500 segmenting strokes per minute to form honeycomb material HC having a 4" (10.1 cm.) core thickness. Operating at this speed, approximately 2,000"/min. (51 m./min.) of composite web C is segmented, stacked and compressed in packing throat PT to form honeycomb core material HC. Festoon F permits the composite web C to be continuously outfed from drive rolls 33a, 33b and permits the web to be intermittently infed into feed rolls 49a, 49b at substantially the same average speed (i.e., approximately 2,000"/min. or 51 m./min.). Not only does the festoon permit continuous infeed and intermittent outfeed, but it can momentarily take up differences between the average infeed and outfeed rates until these rates can be adjusted to be the same. It will be understood that the infeed and outfeed rates may be controlled by varying the speeds of drive motors 37 and 51.

The method of this invention for manufacturing honeycomb material HC comprises the steps of continuously feeding an even numbered plurality of webs W of flexible sheet along a path. The webs are secured together therein face-to-face superimposed relation along lines (e.g., along glue lines L1-L3) extending generally longitudinally of the web and spaced transversely across the webs substantially at equal intervals to form a composite web C. Stripes of adhesive or glue (e.g., glue lines A) are applied to one outside face of the composite web with these stripes extending longitudinally of the composite web. Each of these last-mentioned stripes is positioned intermediate the glue lines securing the adjacent outside web of the composite web to the other webs of the composite web. The composite web is intermittently and positively fed forward a predetermined increment by feed rolls 49a, 49b and is then segmented by blade 59 and anvil 57 to form a segment SG. These segments are then stacked in a stack SK with the adhesive stripes A on one of the segments on the outside face thereof in engagement with the other outside face of the next adjacent segment in the stack and then the segments in the stack are compressed thereby to form a web of honeycomb material HC.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for forming honeycomb material comprising: means for securing together an even numbered plurality of superimposed webs of flexible sheet material to form a composite web by forming adhesive lines between opposite web faces extending longitudinally of the webs and spaced transversely across the webs and by forming adhesive stripes on one outside face of the composite web; feed means engaging the composite web for advancing a predetermined length of composite web past a reference line during an advancing phase and for arresting the movement of the predetermined length during a dwell phase; the feed means comprising at least one web advancing roller engaging a side of the web, a continuously rotating drive member, a link operatively coupled with the drive member for transforming the rotating motion of the drive member into an oscillating motion for the link, and one way clutch means operatively coupling the link and the roller for rotating the roller through an angle of rotation during the advancing phase when the link oscillates in one direction and for arresting the rotation of the roller during the dwell phase when the linke oscillates in the other direction; means defining a pivot axis for the link; adjustment means operatively coupled with the feed means for changing during normal operation of the feed means the predetermined length of composite web advanced by the feed means which includes crank arm means connected with the clutch means, bar means pivotally secured to the link and crank arm means, and means operatively connected with the link and the bar means for changing the distance between the pivot axis and the point at which the bar means is pivotally connected to the link to cause a corresponding change in the angle through which the roller is rotated; means for severing the predetermined length of composite web along the reference line during the dwell phase to form composite web segments; and means for stacking the segment so that the segments are secured to each other by the adhesive stripes.

2. Apparatus according to claim 1 wherein the means for pivotally securing the bar means to the link comprises a slider slideably carried by the link, and wherein the means for a changing the distance comprises means for slideably moving the slider along the link and for maintaining the slider at a set position on the link.

* * * * *